UNITED STATES PATENT OFFICE.

EMIL FRIEDRICH SCHELLER, OF LORSBACH IN THE TAUNUS, GERMANY.

METHOD OF PRODUCING ACETALDEHYDE.

1,244,901.

Specification of Letters Patent.

Patented Oct. 30, 1917.

No Drawing. Application filed June 26, 1917. Serial No. 177,147.

*To all whom it may concern:*

Be it known that I, EMIL FRIEDRICH SCHELLER, a subject of the Emperor of Germany, and a resident of Lorsbach in the Taunus, Germany, have invented a new and useful Method of Producing Acetaldehyde, of which the following is a specification.

This invention relates to a method of producing acetaldehyde by acetylene and steam.

The formation of acetaldehyde by acetylene and steam has already been frequently observed and various catalyzers have been employed for such experiments. So Desgrez has effected the direct hydratation of the acetylene by the aid of charcoal (*Bulletin de la Société Chimique* 3 series 11, p. 363). Bone stated, that by the use of porous porcelain—which represents a combination of different oxids of which argillaceous earth (aluminium oxid) is for instance an effective agent—acetylene and steam can be united at higher temperature (*Proceedings of the Chemical Society* Bd. 21, p. 221). A later observation of Tschitschibabin (*Journ. Russ. Phys. Chem. Ges.* 407 pp. 703–13) confirms, that the most different oxids act as a producer of aldehyde, as for instance $Al_2O_3$, $ZnO$, $FeO$, $NiO$, etc. An economical method to produce technically the acetaldehyde by use of the catalytic effect of oxids could as yet not be worked out. The reason was, that experiments proved that the catalytic effect of the oxids or combinations of oxids, which had been used very quickly decreased or sometimes did not occur at all.

Now it was found, that the oxids which were suitable to produce acetaldehyde are very sensitive to the so called catalyzing poisons. Therefore care must be taken, that the catalyzers are employed from the beginning in an unpoisoned state and that they are not exposed to a poisoning action during the process of producing the acetaldehyde. Phosphorous combinations have been found a highly dangerous poison which also generally accompanies the acetylene commonly produced from carbid. To enable the production of aldehyde the acetylene must be subjected to a careful purifying process.

The necessity of purifying acetylene has already been dealt with in the art of making illuminating gas, and at the present time there are various commercial methods using several substances recognized as fulfilling the requirements for the purification of acetylene; the more important of these substances are bleaching powder, acid solutions of copper or iron salts, acidulated solutions of chromic acid, etc.

These methods are described in minute detail in the technical literature, for instance in the well known text book on "*Acetylene*" by Vivian B. Lewes, 1900, pages 499–520. The purification of acetylene from phosphureted hydrogen, sulphureted hydrogen and other impurities forms no part of my invention and may of course be performed in any known way.

The purification of acetylene thus being known, I shall not further describe its details as the conscientious performance of any of the known methods of purification will lead to a successful preparation for the carrying out of my invention.

The effect of the removal and the keeping off catalyzing poisons is proved by the following experiments:

(1.) In a suitable furnace a mixture of 400 vol. of steam and 15 vol. of acetylene is conducted through a tube with a layer of about 33% molybdic acid asbestos which tube is heated to about 600°. Care is to be taken that nearly 1 l. of the mixture passes the tube per minute per sq. cm. transverse section. If the acetylene is not purified a yield is reached of only about 12% or less, this depending upon the grade of impurities in the acetylene. But if the acetylene is especially freed of the hydrogen phosphorous combinations the yield is increased to nearly 17%.

(2.) In a suitable furnace a mixture of 400 vol. of steam and 15 vol. of carefully purified acetylene is conducted through the tube heated to about 600° with a layer 35 cm. long of asbestos impregnated with molybdic acid. Care is to be taken that 1 l. of the mixture passes per minute per sq. cm. transverse section. If the catalyzer is completely free of phosphorous combinations a yield is reached of about 17%. But the yield decreases to 10%, 5% and less, if phosphorous combinations are present in the acetylene to a certain degree.

What I claim is:

1. The manufacture of acetaldehyde from acetylene and steam by the aid of oxids or combinations of oxids at an elevated temperature consisting in removing the impurities from the acetylene, mixing the purified acetylene with steam and passing the mixture at an elevated temperature over the catalyst.

2. The manufacture of acetaldehyde from acetylene and steam by the aid of oxids or combinations of oxids at an elevated temperature consisting in purifying the acetylene from the phosphorous compounds accompanying same, mixing the purified acetylene with steam and passing the mixture at an elevated temperature over the catalyst.

In testimony whereof I have signed my name to this specification in the presence of two subscribing witnesses.

EMIL FRIEDRICH SCHELLER.

Witnesses:
VALENTIN WEICKEL,
EMMY NOLL.